United States Patent [19]

Bright et al.

[11] 3,742,263

[45] June 26, 1973

[54] CHARGE EMITTING DEVICES

[75] Inventors: Alfred William Bright, Highfield; Brian Makin, Botley; David Robert Lamb, Eastleigh, all of England

[73] Assignee: National Research Development Corporation, London, England

[22] Filed: Apr. 19, 1971

[21] Appl. No.: 134,967

[30] Foreign Application Priority Data

Apr. 24, 1970 Great Britain ................ 19,844/70

[52] U.S. Cl. ................................ 310/5, 324/62

[51] Int. Cl. ...................... G01r 27/02, H02n 1/00

[58] Field of Search ................................ 360/5

[56] References Cited

UNITED STATES PATENTS 2,827,577 3/1958 Kimberlin, Jr. et al. ............... 310/5

*Primary Examiner*—L. T. Hix

*Attorney*—Cushman, Darby & Cushman

[57] ABSTRACT

A device for injecting electric charge into fluids consists of a p-n junction diode having the junctions so positioned that an active region of the semi-conductor is in contact with the fluid. A reverse electric field of a magnitude sufficient to release charge carriers having energies greater than the potential barrier at the surface of the semi-conductor is applied to the junction so that charge carriers are emitted from the active region. An electrode is also immersed in the fluid to enable a drift field to be established to attract charge carriers in the fluid away from the surface of the semi-conductor.

9 Claims, 5 Drawing Figures

CHARGE EMITTING DEVICES

The invention relates to charge emitting devices and more particularly to the use of such devices for the injection of electric charge into fluids.

Hitherto, the injection of electric charge into liquids, for example in liquid-filled electrostatic generators, has been achieved by the application, to injecting electrodes having the form of metal knife edges or combs, of voltages sufficiently high to cause field emission of electrons from the sharp edges or tips of the injecting electrodes. Typically, the voltages required are of the order of 30 Kilovolts at current densities of about 10 micro amperes per centimeter length of knife edge. For many purposes, the use of such voltages is inconvenient and poses problems both in their production and handling.

The use of semi-conductor tunnel diodes of the metal-oxide type has been proposed, but in use such diodes have been found to have only a restricted lifetime.

It is an object of the invention to provide an improved charge emitting device which can be used for the injection of electric charge into fluids at considerably reduced voltages than hitherto.

According to the invention in one aspect there is provided a charge emitting device comprising a chamber for containing a fluid into which electric charge is to be injected, a semi-conducting translation device having at least one p-n junction positioned to provide an active region in the surface thereof and mounted within the chamber in such a manner that the fluid can be caused to come into contact with said active region, means for enabling a reverse electric field of a magnitude sufficient to release charge carriers having energies greater than the potential barrier at said active region to be applied to the junction so that said charge carriers will be emitted from said active region. In another form of the invention an electrode in the chamber is provided to enable a drift field to further be established between the translation device and the electrode to attract charge carriers into the fluid.

According to the invention in another aspect there is provided a method of injecting electric charge carriers into fluids comprising the operations of immersing an active region of a semi-conducting translation device in the fluid, operating the said translation device under conditions of reverse bias such that free charge carriers are produced at the junction within the translation device having an energy sufficient to enable them to surmount the potential barrier existing at an active region of the surface of the translation device, and applying a drift field between the translation device and an electrode also immersed in the fluid.

The term fluid is intended to include gases and plasmas.

A translation device, which is particularly suitable for use in performing the present invention because of its chemical stability and resistance to attack, consists of a diode in the form of a body of single crystal silicon carbide having a p-n junction within it.

In a particular form of diode the p-n junction is situated at a distance of less than 5,000 A (preferably less than 3,000 A) below the surface of a body of single crystal silicon carbide. A junction at such a depth is sufficiently close to the crystal surface for electrons generated at the junction to travel through the material above the junction and still have sufficient energy to surmount the surface potential barrier. One way to produce an n-type layer of the required thickness is by ion-implantation, that is by the acceleration of positive ions of the required doping material, for example, nitrogen, through potentials of up to 400 Kilovolts and causing them to impinge upon the silicon carbide crystal.

The resistance of the diode to poisoning by adsorbed material is, in some circumstances, improved by forming on the surface of the diode an oxide layer of up to some 50A. A layer of such a thickness still permits an appreciable rate of electron emission from the diode.

The invention will now be further described by way of example with reference to the accompanying diagrams in which.

Figure 1:
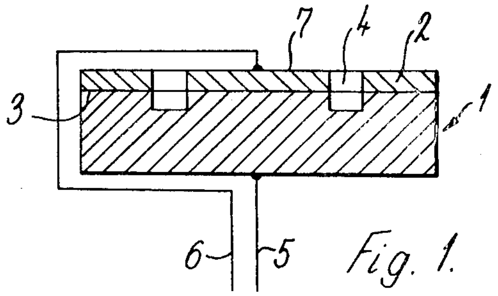
FIG. 1 shows a cross section of a diode suitable for use in performing the invention.

Referring to FIG. 1, a diode of a known type which is suitable for use in performing the invention consists of a body 1 of silicon carbide of p-type conductivity having a surface layer 2 which is doped to make it n-type, thus forming a p-n junction at a region 3 within the body 1.

An annular slit 4 is formed in the body 1 and penetrates through the n-type surface layer 2 into the p-type region of the body 1. Leads 5 and 6, respectively, are applied to the p-type region and to the central island 7 of the n-type layer 2. When such a diode is operated under conditions of reverse bias, electrons are emitted from the side of the central island 7 where the p-n junction meets the surface.

Figure 2:
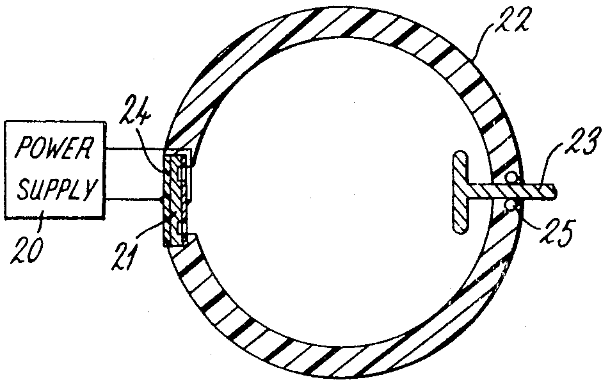
FIG. 2 shows an embodiment of the invention.

FIG. 2 shows an electron emitter 21 consisting of a diode such as that described above connected to a power supply 20 and mounted in a chamber or conduit 22 through which a liquid can be caused to flow. Opposite the electron emitter 21 is an extractor electrode 23 which enables a drift or extraction electric field to be applied so as to cause electrons emitted from the diode 21 to enter into the liquid. The voltage required to produce the drift field is of the order of 10 Volts. In order to isolate the electron emitter 21 from the extractor electrode 23 the conduit 22 is made of an inert plastics material such as polytetrafluroethylene.

The electron emitter 21 is held in place by means of a body 24 of polyester potting compound, and the extractor electrode 23 is sealed in position by means of an O-ring seal 25.

Figure 3:
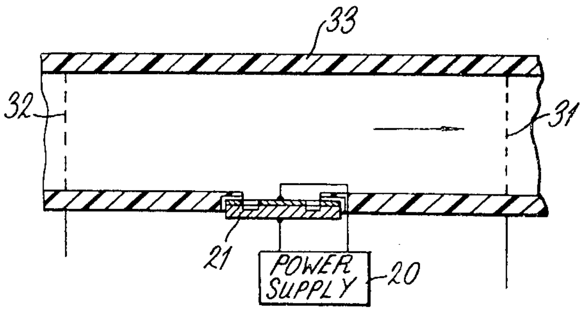
FIG. 3 shows a second embodiment of the invention.

FIG. 3 shows a liquid velocity meter embodying the invention. In this case, two extractor electrodes are used, 31 and 32 respectively. The electrodes 31 and 32 are in the form of wire gauze screens across a conduit 33 made of a non-conducting material through which a liquid, the velocity of which is to be measured, is flowing. If there was no fluid flow the charges received at these electrodes would be equal and depend upon the mobility of the electrons in the liquid. When the liquid is flowing, however, the downstream electrode 31 will receive a greater number of electrons than the upstream electrode 32, the exact relationship depending upon the coupling of the electrons to the liquid, and the difference in the charges received by the electrodes 31 and 32 is a measure of the velocity of the liquid flowing in the conduit 33. The charges received at the electrodes 31 and 32 are measured in a conventional fashion in terms of the electric currents which can be extracted from the electrodes 31 and 32.

Figure 4:
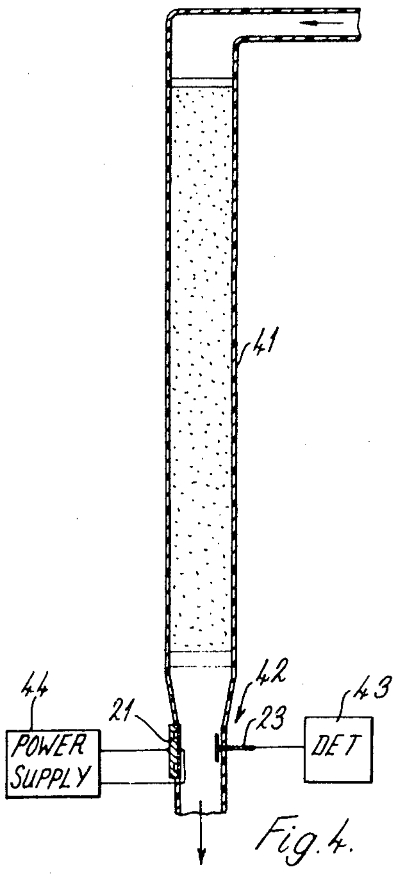
FIG. 4 shows another embodiment of the invention.

FIG. 4 shows a liquid chromatographic column 41 embodying the invention, an electron emitter 21 and an extractor electrode 23 are located at the base 42 of the column 41. When a sample which has been injected into the column 41 arrives at the base 42 of the column 41, there is a change in the conductivity of the material flowing past the electron emitter 21 and consequently there is a change in the current flowing through the extractor electrode 23, which is detected and amplified in a conventional fashion by a detector 43. This is due to a difference in the mobility of the electrons in the moving phase and the solute. If desired, the electron mobilities for different solutes may be determined by operating the diode constituting the electron emitter 21 in a pulsed mode by means of a pulsed power supply 44. The time interval between electrons emitted during a pulse and their collection by the extractor electrode 23 is representative of the mobility of the electrons.

In the chromatographic columns in which electrical detectors are incorporated, it is necessary to overcome the standing signal produced by the moving phase, which can be orders of magnitude larger than the signal produced by the solute, or solutes.

Figure 5:
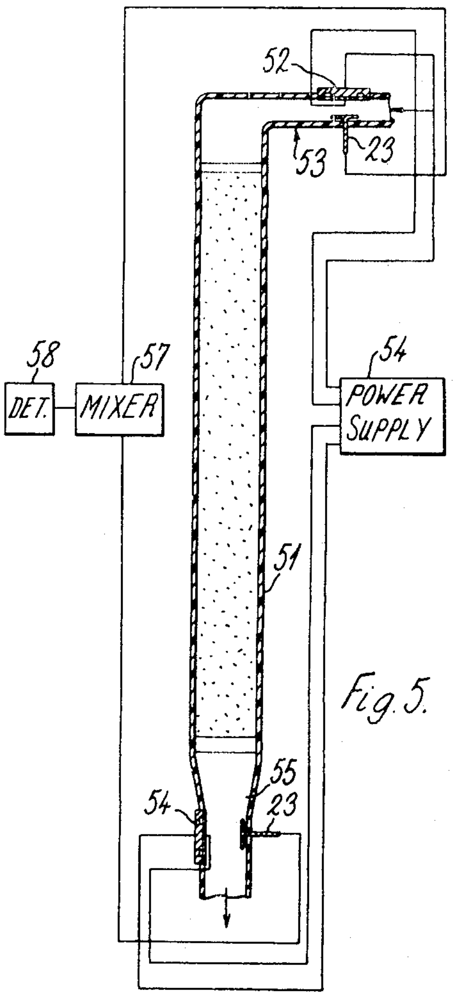
FIG. 5 shows a further embodiment of the invention.

FIG. 5 shows a way in which this may be done by means of the present invention. A chromatographic column 51 incorporates a first emitter device 52 at the input end 53 of the column 51 and a second emitter device 54 at an outlet end 55 of the column 51, each having a respective extractor electrode 23. Both the emitters 52 and 54 are operated simultaneously in a pulsed mode from a power supply 56 but "back-to-back," the signal from the electrode 23 at the input end 52 of the column 51 being applied in opposition to that from the extractor electrode 23 at the output end 53 of the column 51 at a mixer 57 thus backing off that part of the signal at the outlet end 53 of the column 51 which is due to the moving phase. The final output signal is applied to a detector 58. By this means, currents due to a solute as low as $10^{-12}$ amps may be distinguished from standing currents of as much as $10^{-9}$ amps due to the moving phase.

Another use to which the invention may be put is in electrostatic generators such as those described in our specification U.S. Pat. no. 3,527,992.

The invention can also be used in electrostatic generators of the jet-type in which a carrier liquid is caused to flow continuously past a source of charge and carries electric charge away from the source.

In this case, one or more diodes are mounted in the path of liquid flowing through a conduit and one or more extractor electrodes are positioned slightly downstream of the electron emitter, or emitters. A collector electrode, which suitably may be a gauze screen across the conduit further downstream picks up charge carried by the liquid.

We claim:

1. An electron emitting device for use in a chamber for containing a fluid into which electric charge is to be injected comprising: a semi-conductor translation device having at least one p-n junction positioned to provide an active region in the surface there-of and mounted within the chamber in such a manner that fluid in said chamber can be caused to come into contact with said active region, and means for enabling a reverse electric field of a magnitude to release charge carriers having energies greater than the potential barrier at said active region to be applied to the junction so that said charge carriers will be emitted from said active region.

2. A charge emitting device as claimed in claim 1, in which the translation device is a p-n junction diode.

3. A charge emitting device as claimed in claim 2, in which the diode is a single crystal of silicon carbide having a p-n junction within it.

4. A charge emitting device as claimed in claim 1, in which the p-n junction extends to the surface of the translation device.

5. A charge emitting device as claimed in claim 1, in which the junction is disposed below the surface of the translation device at a depth sufficiently close to such surface for electrons generated at the junction to have sufficient energy to surmount the surface potential barrier after travelling through the material between the junction and the surface.

6. A charge emitting device as claimed in claim 5, in which the depth of the junction is less than 5,000 A.

7. A method of injecting electric charge carriers into fluids, comprising the operations of immersing an active region of a semi-conducting translation device in the fluid, operating the said translation device under conditions of reverse bias such that free charge carriers are produced at the junction within the translation device having an energy sufficient to enable them to surmount the potential barrier existing at an active region of the surface of the translation device, and applying a drift field between the translation device and an electrode also immersed in the fluid.

8. A method as claimed in claim 7 including the operation of applying a drift field between the translation device and an electrode also immersed in the fluid for further urging charge into the fluid.

9. A charge emitting device as claimed in claim 1 further including an electrode in the chamber to enable a drift field to be established between the translation device and the electrode to attract charge carriers into the fluid.

* * * * *